May 23, 1933.   R. G. HAMAKER   1,910,210
DRILL BIT
Filed May 8, 1931

Rex G. Hamaker
INVENTOR.

BY
ATTORNEY.

Patented May 23, 1933

1,910,210

UNITED STATES PATENT OFFICE

REX G. HAMAKER, OF HOUSTON, TEXAS, ASSIGNOR TO REED ROLLER BIT COMPANY, OF HOUSTON, TEXAS, A CORPORATION OF TEXAS

DRILL BIT

Application filed May 8, 1931. Serial No. 535,940.

This invention relates generally to deep well apparatus and specifically to drill bits.

In deep well drilling, it is now customary to pump muddy water, known as slush, downwardly through the drill stem to remove the cuttings of the drill bit. The conventional bit embodies a cutter pin carried by bearing portions of the bit head; and slush, issuing from the slush passages, cuts into the bearing portions.

This invention has for one of its specific objects the provision of a new and improved washer and associated parts to prevent wear of the bearing portions of a bit head by the slush.

Another specific object of the invention is to provide a new and improved arrangement of parts whereby to prevent wear of the roller cutters.

Figure 2:
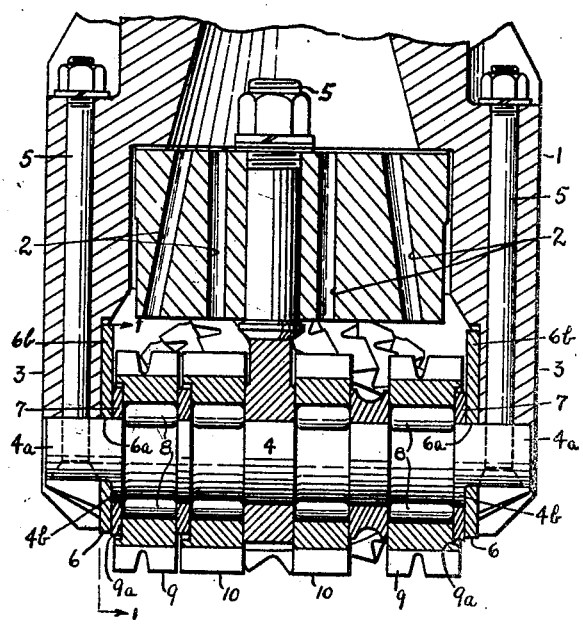
Figure 1:
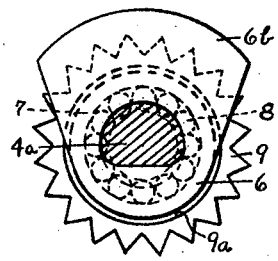

The preferred embodiment of the invention is illustrated by the accompanying drawing, of which Fig. 1 is a detail view, taken substantially on the line 1—1 of Fig. 2, and illustrating the arrangement of the washers, pin and cutter; and Fig. 2, a fragmentary sectional elevation of a bit head including said arrangement.

In the drawing, the bit head is indicated at 1. Its slush passages are indicated at 2; and its bearing portions at 3. Extending across the bottom of the head and having ends 4a fitting in the bearing portions 3 is a cutter pin 4, known as a cross roller cutter pin. This pin may be held in the head by suitable bolts 5 forming no part of the present invention.

The ends 4a of the pin 4 are non-circular in cross section, as shown by Fig. 1. Each of the washers 6 has an opening 6a through which one end 4a of the pin extends; and an apron 6b extending upwardly along the bearing portion 3.

On the circular portions 4b of the pin and and adjacent the washers 6 are rotatable washers 7.

Upon the pin adjacent the washers 7 are bearing rollers 8; and upon the bearing rollers 8 are roller cutters 9, each having a recess 9a for the reception of one of the washers 7.

Between the cutters 9 are other cutters 10.

It will be apparent from the foregoing that the aprons 6b of the washers 6 will shield the bearing portions 3 to prevent wear thereof by slush issuing from passages 2.

If the friction between rotatable washer 7 and stationary washer 6 is greater than the friction between rotatable washer 7 and cutter 9, the washer 7 will remain stationary with the washer 6. If, on the other hand, the friction between washer 7 and cutter 9 is greater than the friction between washer 7 and washer 6, then washer 7 will rotate with cutter 9 while washer 6 remains stationary. This substantially reduces wear of the parts.

I claim:

1. A bit having a bearing portion, a fluid passage opening adjacent said portion, a pin in said portion, a first washer non-rotatably held by said pin and having an apron extending along said bearing portion to shield it from fluid issuing from said passage, a second washer rotatable on said pin adjacent and bearing against the side of said first washer, and a roller cutter rotatable on said pin adjacent and bearing against the side of said second washer.

2. A bit having a bearing portion, a fluid passage opening adjacent said portion, a pin in said portion, a first washer non-rotatably held by said pin and having an apron extending along said bearing portion to shield it from fluid issuing from said passages, a second washer rotatable on said pin adjacent and bearing against the side of said first washer, and a roller cutter rotatable on said pin adjacent and bearing against the side of said second washer, said cutter having a recess in which said second washer is disposed.

In testimony whereof, I hereunto affix my signature.

REX G. HAMAKER.